United States Patent [19]

Moser et al.

[11] Patent Number: 4,794,768

[45] Date of Patent: Jan. 3, 1989

[54] PUSH BUTTON COMBINATION LOCK TYPE GAS CAP AND ACTUATOR EMPLOYED THEREIN

[76] Inventors: Douglas J. Moser, 371 Lynn Dr., Ventura, Calif. 93003; Damian Synclair, 3958 W. Sweetwater Dr., Tucson, Ariz. 85745; Alan R. Friedman, 3400 W. Goret Rd., Tucson, Ariz. 85745

[21] Appl. No.: 98,658

[22] Filed: Sep. 21, 1987

[51] Int. Cl.⁴ ............................................. B65D 55/14
[52] U.S. Cl. ...................................... 70/165; 70/220; 70/306; 70/288
[58] Field of Search ................. 70/158, 163, 164, 165, 70/166, 167, 168, 169, 170, 171, 172, 173, 214, 220, 231, 288, 304, 306, 312, 313

[56] References Cited

U.S. PATENT DOCUMENTS

| | | | |
|---|---|---|---|
| 2,229,366 | 1/1941 | Brannon | 70/168 |
| 3,099,150 | 7/1963 | Check | 70/214 |
| 3,435,647 | 4/1969 | LeBlanc | 70/214 |
| 3,802,231 | 4/1974 | Pig | 70/165 |
| 3,901,407 | 8/1975 | Mitchell | 70/169 |

Primary Examiner—Robert L. Wolfe
Attorney, Agent, or Firm—Sughrue, Mion, Zinn, Macpeak & Seas

[57] ABSTRACT

A push button combination lock type gas cap and an actuator forming a part thereof, takes the form of a casing which may be mounted to an open end of a fuel tank filling neck with a stopper mounted within the casing for movement between a first position in which the cap is removable from the filler neck, and a second position where the cap is locked thereto. A first center push button mounted on the casing for movement in the direction of its axis between projected and depressed position, shifts the stopper to the first position for locking the cap to the filler tube upon depression thereof. The first push button is maintained in depressed position with a laterally shiftable slide plate operatively engaging the first push button for normally preventing retraction of the first push button absent a selective depression of one or more of a plurality of second push buttons mounted circumferentially about the center push button. The second push buttons are also normally held in depressed position, unless further depressed and released. Spline engagement between the push buttons and casing bores alternatively lock the depressible push buttons in initial depressed position and subsequent projected position. Rotatable pods beneath the depressible push button, engage lock pins having side recesses which when aligned with holes within the slide plate receiving the lock pins permit lateral shifting of the slide plate to release the first push button.

16 Claims, 7 Drawing Sheets

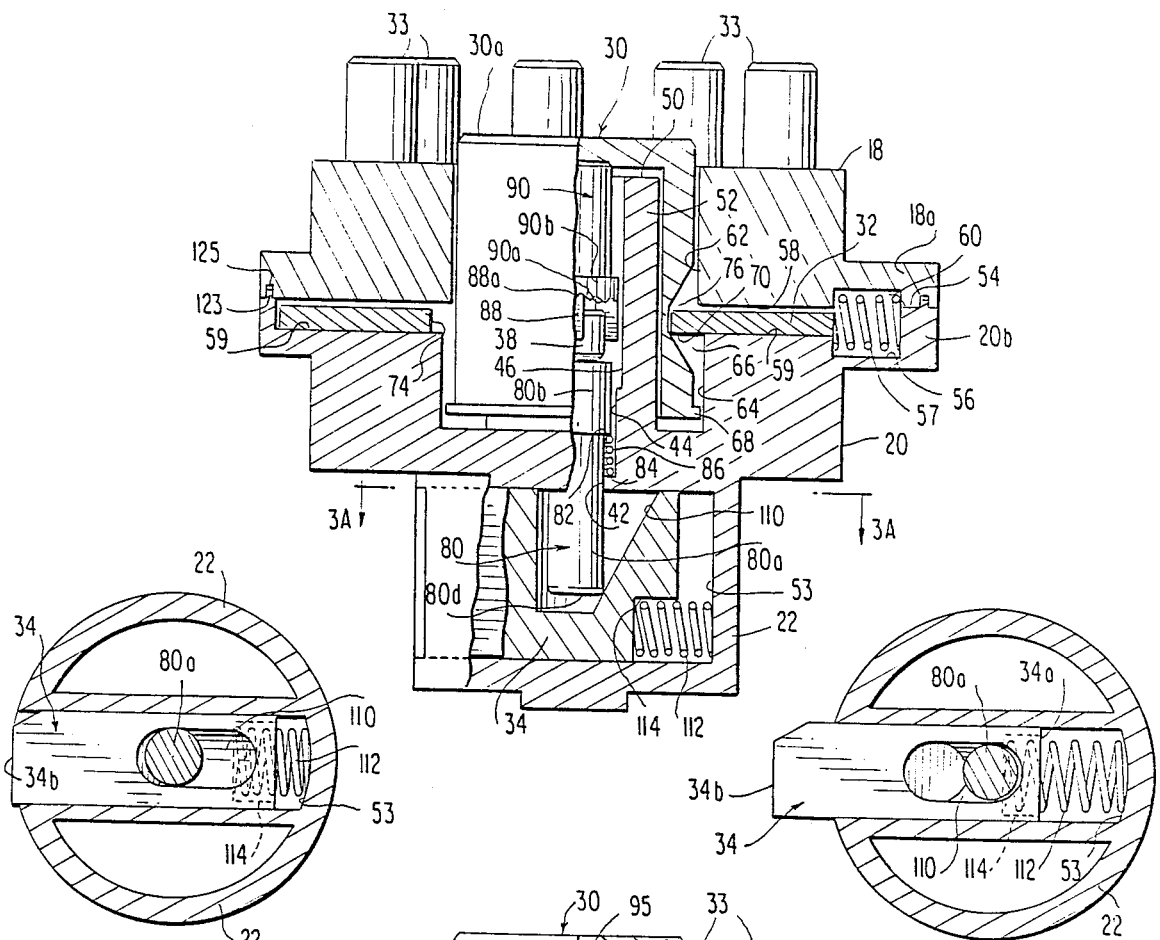
FIG. 3
FIG. 3A
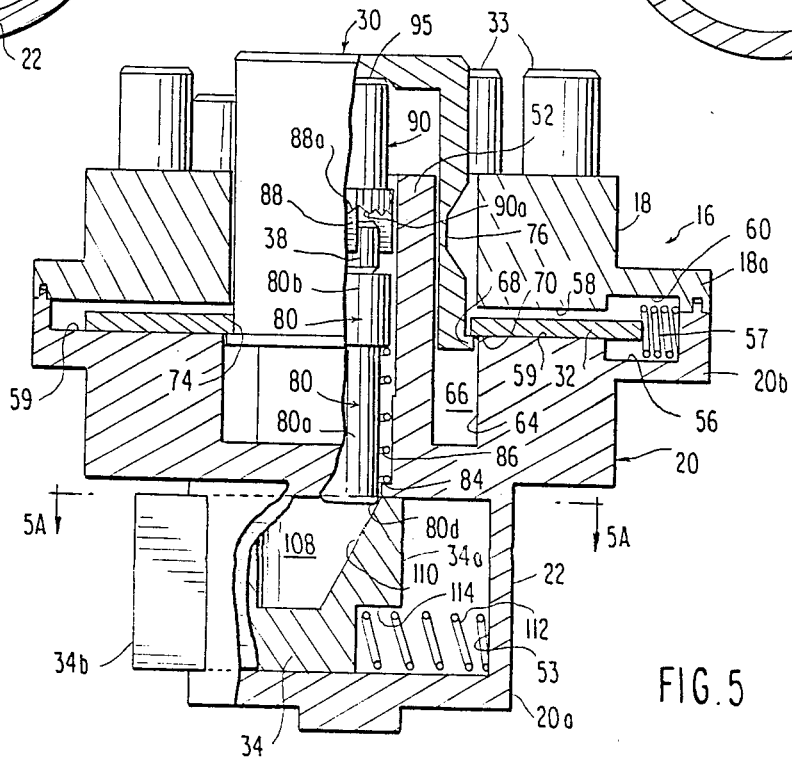
FIG. 5A
FIG. 5

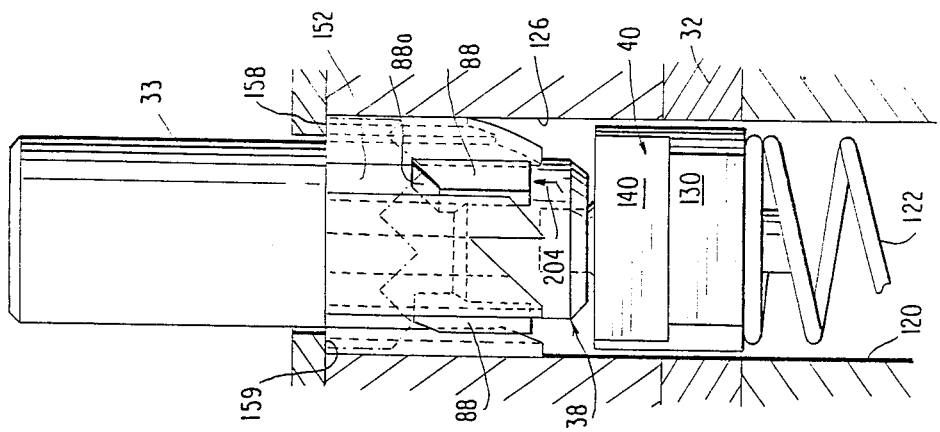
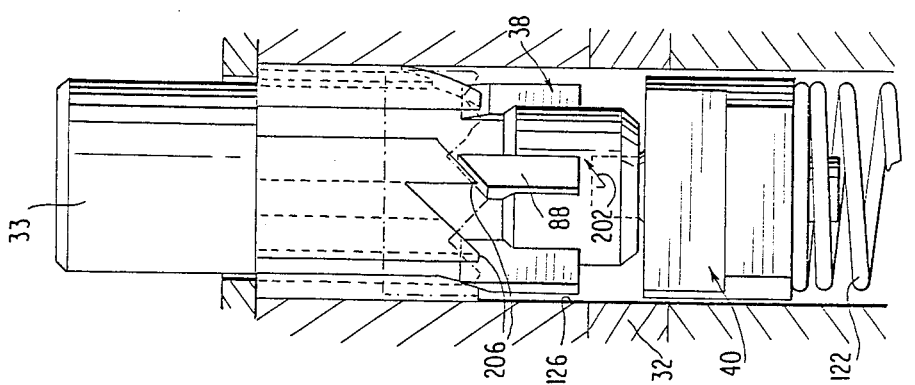
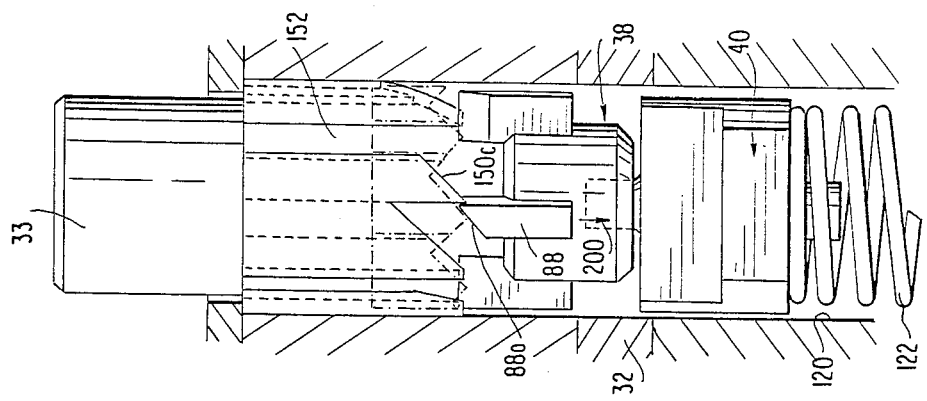
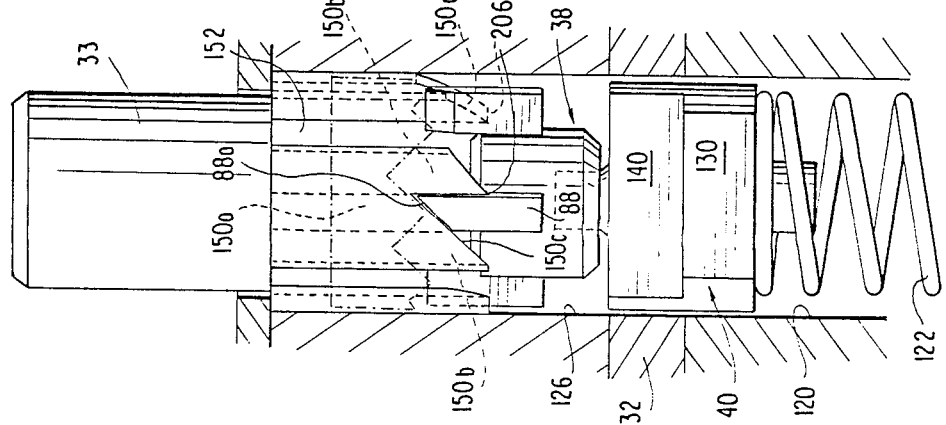

PUSH BUTTON COMBINATION LOCK TYPE GAS CAP AND ACTUATOR EMPLOYED THEREIN

FIELD OF THE INVENTION

This invention relates to lockable gas caps for automotive vehicles and more particularly to a lockable gas cap which may be selectively locked and unlocked to the open end of a fuel tank filling pipe by combination code dial selection.

BACKGROUND OF THE INVENTION

Gas caps are mechanically coupled to the upper, open end of a fuel tank filling neck or tube to seal off the tank interior yet provide access for filling at the service station. Access to the filling neck is external of the automobile through a pivotable flap or door within the vehicle body. Such flaps or doors may carry a lockable lock for preventing access to the cap. Additionally, the integrity of the fuel system is maintained by key lockable gas caps.

Over the years, gas caps which include a combination lock have been devised for closing off the open end of the fuel tank filling neck. The following patents are exemplary of known combination type gas caps:

U.S. Pat. Nos. 965,590 Lokody, 1,403,328 Keplinger, 1,898,373 Jay, 2,229,366, Brannon et al, 2,437,674 Armbruster, 2,588,605 Armbruster, 3,802,231 Pig, and 3,985,007 Gerdes.

Certain of these patents are exemplary of the development of the art. In U.S. Pat. No. 3,802,231, a series of manually rotatable coaxial actuating rings each carrying a series of external reference marks are placed about a member including a non-manually rotatable external surface carrying at least one reference mark. Unscrewing of the cap and thus unlocking is effected upon proper angular placement of the rings relative to each other and the balance of the locking cap structure.

U.S. Pat. No. 2,229,366 is directed to an inverted U-shaped metal cap fittable about the open end of the fuel tank filler neck, which neck includes a radially inwardly directed rim. The cap mounts internally a radially projecting projectable bolt and carries a rotary dial on the exterior of the cap and at the center thereof. The dial is rotated to dial in a combination for positioning of multiple disks which, in turn, permit or prevent radial shifting of the bolt via an external slide fixed to the bolt to project or retract the end of the bolt from a position beneath the radially inwardly directed rim and thus to free the cap or to retain it on the neck.

While such combination locks are capable of effectively locking and unlocking the cap to the filler neck, the requirements to rotate the dial in multiple directions and to given degrees in sequence requires time.

Additionally, combination locks have been developed using multiple depressible push buttons which may be required to be selectively and/or sequentially depressed. The number of push buttons and given sequence may vary depending upon the combination employed.

It is therefore a primary object of this invention to provide a combination lock type gas cap and actuator therefor employing a plurality of depressible push buttons, in which the combination is set at the factory and the consumer cannot change the combination without breaking open the lock, the gas cap is robust and wherein, the combination lock type gas cap includes a locking mechanism which effectively couples and uncouples an externally accessible upper cap member to an externally threaded sleeve coaxially with the cap member, and rotatable on a cylindrical casing which projects from the cap member and which rotatably supports the sleeve, and wherein, the sleeve in turn is threaded into the open end of a fuel tank filling neck.

BRIEF DESCRIPTION OF THE DRAWINGS

FIG. 3 is a vertical sectional view, partially broken away, of the gas cap of FIG. 1 under gas cap lock conditions.

FIG. 3a is a horizontal sectional view of the gas cap of FIG. 3, taken about line 3a—3a.

FIG. 5 is a vertical sectional view similar to that of FIG. 3.

FIG. 5a is a horizontal sectional view of the gas cap of FIG. 5, taken about line 5a—5a.

FIGS. 17A through 17D are vertical sectional views illustrating in sequence, the operation of the gas cap and the actuator push buttons during locking and unlocking of the gas cap forming one embodiment of the present invention.

DESCRIPTION OF THE PREFERRED EMBODIMENT

Figure 1:
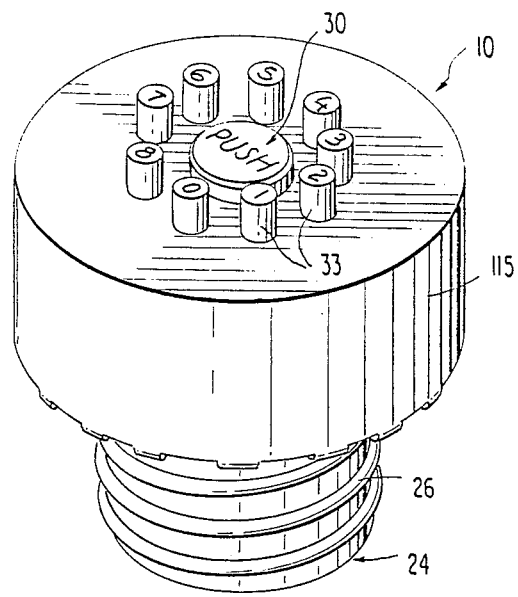
FIG. 1 is a perspective view of the push button combination lock type gas cap forming a preferred embodiment of the invention.
Figure 6:
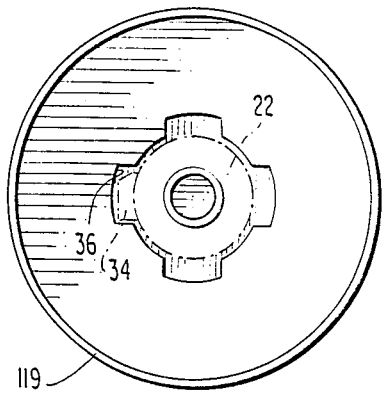
FIG. 6 is a top plan view of the outer sleeve of the gas cap of FIG. 1.

Reference to the drawing figures show a combination lock type gas cap indicated generally at 10 forming a preferred embodiment of the invention as being threadably fitted to a filler neck 12 of an automobile gas tank or the like as at 14. Cap 10 comprises principally a two part cap assembly or actuator indicated generally at 16. Assembly 16 is composed of cap assembly upper and lower casing halves 18 and 20 and wherein, the lower casing half 20 includes a barrel section 22 of cylindrical form, of reduced diameter. Rotatably mounted to barrel section 22 is a sleeve or shank 24 bearing external threads 26 and having a conical tip 24a. This permits the sleeve 24 to be threaded internally within the fuel tank filler neck 12 via appropriate female threads 28 of the fuel tank filler neck.

Figure 2:
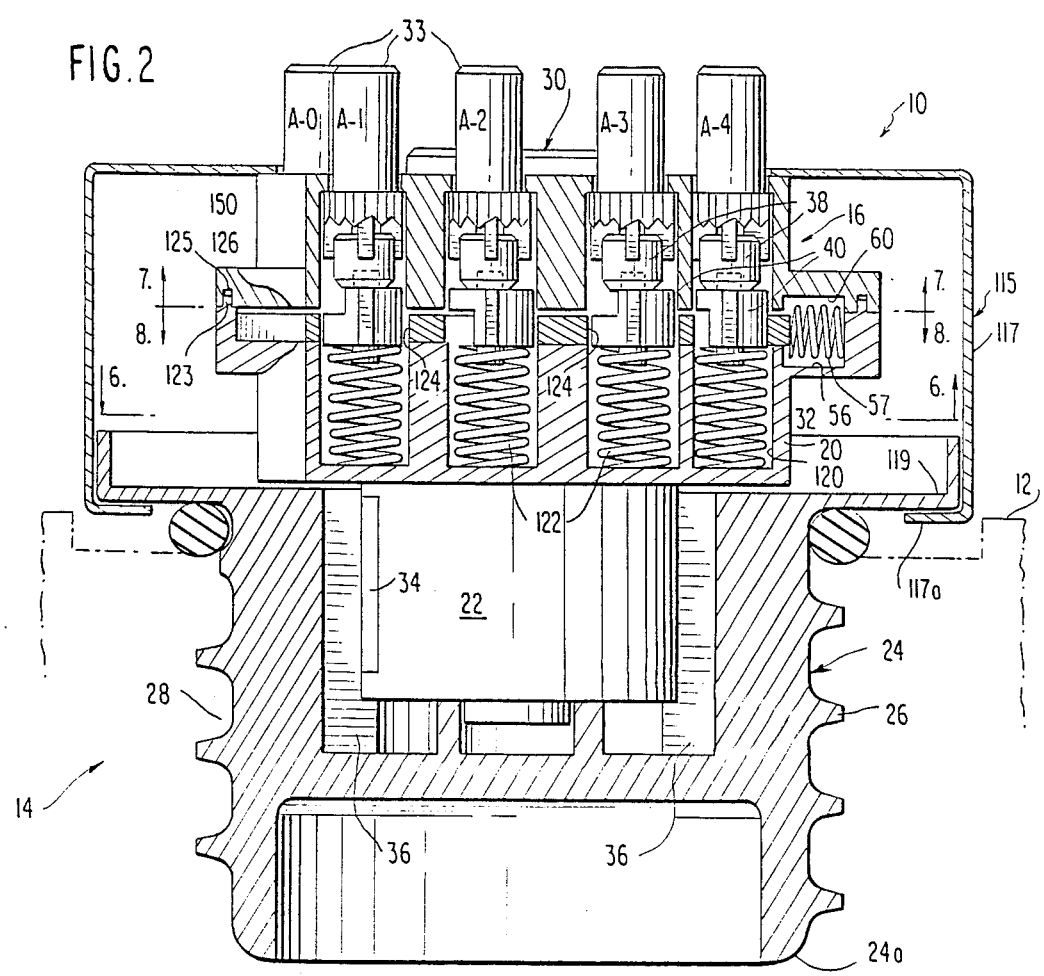
FIG. 2 is a vertical sectional view of a portion of the gas cap of FIG. 1, under gas cap locked conditions.

From FIG. 2, where the cap is on the filler neck 12 and in a locked position, the cap assembly 16 is rotated in a clockwise direction. As will be seen hereinafter, when a main center push button 30 at the center of the cap assembly 16 is depressed, thus "in the down" position, the cap assembly 16 and the threaded sleeve 24 are not engaged. The cap assembly 16 can be turned clockwise independent of the threaded sleeve 24 which could turn counterclockwise if the cap assembly 16 was not secured in the fuel tank filler neck 12. This is a locked condition since, only by unthreading the threaded sleeve 24 can the cap 10 be removed. As shown in FIG. 1, the upper cap assembly casing half 18 carries further, a series of small diameter combiation push buttons 33 in a circumferential array, evenly circumferentially spaced about the periphery of push button 30, which is centered on the axis of the cap 10.

The make-up of the combination lock type gas cap 10 may be further seen by review of the drawing FIGS. 2 through 11.

FIGS. 2 through 5 inclusive tend to show graphically, the nature of the components making up the combination lock type gas cap 10. The principal components, primarily carried by cap assembly 16 and within the upper casing half 18 and lower casing half 20 of that assembly, are the combination push buttons 33, the center push button 30, a slide plate indicated generally at 32, a stopper indicated generally at 34 and projectable into a recess indicated in dotted lines at 36 formed within the inner periphery of the cup shaped threaded sleeve 24, a number of rotating pods indicated generally at 38 underlying respective combination buttons 33, being in mechanical engagement therewith, a series of modified cylindrical lock pins indicated generally at 40, and compression coil springs 122.

From reference to FIG. 1 and the sectional views of FIGS. 2 and 4, and 3 and 5 it may be fully appreciated as to the location and make-up of the central push button 30 and the various combinations push buttons 33 for cap assembly 16. In that respect, and looking first to the vertical sectional views of FIGS. 3 and 5, it may be seen that the lower casing half 20 is of cup shape form, which may be made of a cast metal, molded plastic or the like, being provided with a central bore 42 which is counterbored at 44. Counterbore 44 includes an annular recess 46 defining an upper shoulder or stop 48 just below the top 50 of a cylindrical central projection 52 which rises well above the meeting face 54 of the cap assembly lower casing half 20. Further, there is a rectangular transverse cross section cavity 53 formed within a reduced diameter portion 20a of the cap assembly lower casing half 20, while that cylindrical member includes a radially enlarged flange 20b. Within flange 20b is formed a coil spring receiving recess or cavity 56 which is oriented radially, and opens to an annular cavity 58. Cavity 58 is formed by a annular recess 59 within the cap assembly lower casing half 20 at a contact face 54 between the lower casing half 20 and the upper casing half 18, within which is mounted slide plate 32. The upper casing half 18 is of inverted cup shape and is provided with a radially enlarged flange 18a including a radially projecting recess 60 matching lengthwise and widthwise that at 56 of the lower casing half 20 and receiving a portion of the coil spring 56. Additionally, the upper casing half 18 is provided with an axial bore 62 which may be of a diameter equal to the lower outer diameter of an annual groove 64 within the lower casing half 20 of cap assembly 16. The bore 62 within the cap assembly upper half 18 cooperates with the axial cylindrical projection 52 and groove 64 of the lower cap assembly half 20 to form an annular chamber 66 for receiving an inverted cup shaped center button 30. The center button includes a radially enlarged rim or flange 68 at its bottom which has a diameter which is slightly larger than the diameter of bore 62 so that, rim 68 impinges on the lower surface 70 of slide plate 32 to limit further movement of the center button 30 vertically upwardly as will be seen hereinafter. The vertical movement of center button 30 is limited by engagement between rim 68 of the center button 30 and lower face 70 of slide plate 32 mounted within cavity 58 between the two halves 18, 20. A circular hole 74 is formed within the slide plate through which projects the center button 30. Further, center button 30 is provided with a V-shaped recess or notch 76 within its outer periphery radially on the side thereof facing a coil spring 57. The coil spring 57, FIG. 3, tends to bias the slide plate 32 to the left, to hold the center button in the depressed position when edge of the hole 74 within the slide plate 32, acting as a pawl engages the V-shape recess or notch 76 within the center button. However, the push button 30 is further biased by coil spring 86 such that it tends to move axially upwardly, FIGS. 4 and 5, to a position where, the top 30a thereof is flush with the tops of non-depressed combination push buttons 33 with the bias of spring 86 strong enough to cam the slide plate 32 to the right against the bias of coil spring 57.

Figure 12:
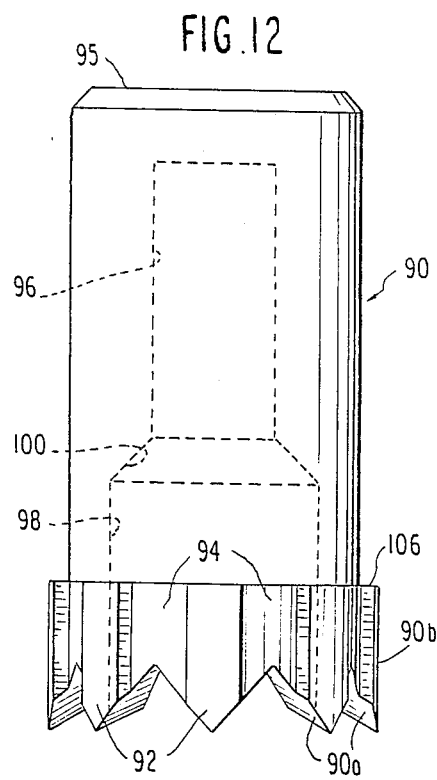
FIG. 12 is an elevational view of one of the long stem of the center push button of the cap member.
Figure 13:
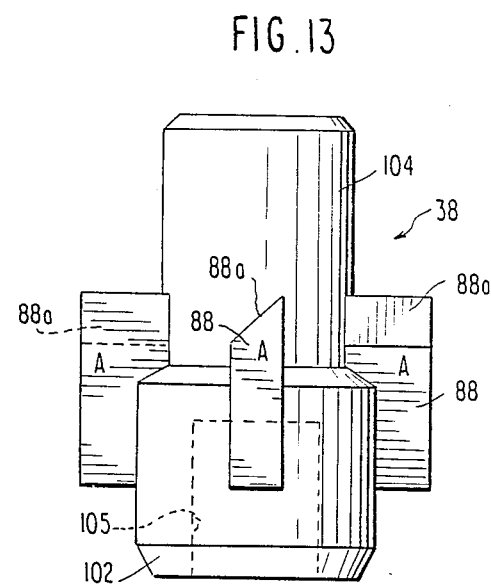
FIG. 13 is an elevational view of a rotating pod of the cap member.
Figure 12A:
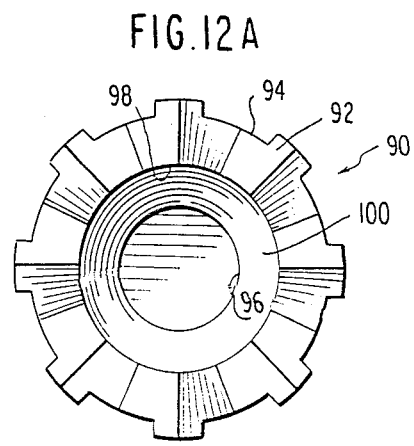
FIG. 12A is a bottom plan view of the long stem of FIG. 12.

Effecting that biasing involves three coaxial members. An elongated plunger indicated generally at 80, is of cylindrical form, having a lower portion of a given diameter at 80a, and a radially enlarged portion 80b forming an annular shoulder 82. Concentrically positioned about plunger 80, and interposed between shoulder 82 of the plunger and a further shoulder 84 defined by bore 42 and counterbore 44 with lower casing half 20, is the compression coil spring 86 acting to drive the plunger 80 vertically upwards. Positioned coaxially and above the plunger, is a rotating pod 38, bearing radial bars 88 having oblique end faces or edges 88a, preferably at 45°, and matching the 45° C. beveled, serrated edges 90a of a cylindrical long stem indicated generally at 90, FIGS. 12, 13. The cylindrical long stem, FIG. 12, includes a radially enlarged portion 90b within which are formed the series of spline grooves 94, the lower end of radially enlarged portion 90b being serrated by oppositely oblique intersecting end faces at 45°. Additionally, the radially enlarged portion 90b, as further seen in FIG. 12 is provided with a bore 96 extending from the lower end thereof toward upper end face 95, which bore 96 is counterbored at 98, and which is provided with an oblique transitional portion 100 therebetween, at an angle of 45°. Sliding interiorly and rotatably positioned within bore 96 and counterbore 98 is the upper end of rotating pod 38. As shown in FIG. 13, each pod 38 has a large diameter base portion 102, and a reduced diameter portion 104, which is insertable into the axial opening defined by the bore 96 and counterbore 98 of the long stem 90. Further, a radial shoulder 106 is formed by the radially enlarged portion 90b of the long stem, shoulder 106 abutting shoulder 48 formed at the upper end of the cylindrical projection 52 of the lower casing half 20 of cap assembly 16. Shoulder 48 functions as a stop, FIG. 5, to limit upward movement of the long stem 90 driven through pod 38, via plunger 80 under the force of compression coil spring 86. The grooves 94 within the outer periphery of the radially enlarged portion 90b of the long stem define radial proportions 92 and form part of a spline connection for permitting axial movement but preventing rotation of the long stem 90 as it moves within counterbore annular recess 46 of the cylindrical projection 52 of lower casing half 20.

Further, as seen in FIG. 13, there is a hole or bore 105 drilled axially from the bottom of the rotating pod 38 and extending for some distance upwardly within the radially enlarged portion 102 of pod 38. That hole or bore 105, receives the reduced diameter tip 80c of the plunger 80, FIG. 5, to maintain positioning and alignment between the rotating pod 38 and the plunger 80 upon which the pod 38 rotatably mounts, FIGS. 3, 5.

It is further noted that the lower edge of the plunger is rounded as in 80d. The lower end 80d of the plunger 80a cams the stopper 34 by being received within a cam follower recess 108, FIGS. 3, 5 and by contacting oblique cam follower surface 110 of the stopper 34. The stopper 34, which moves radially between the positions shown in FIGS. 3, 3A; and the position shown in FIGS. 5, 5A, is spring biased toward projected position, FIG. 5, by a coil spring 112. One end of spring 112 is received within a circular hole 114 within the radially inner end face 34a of the stopper. Its radially outer end face 34b, is projectable into aligned recess 36 of the threaded sleeve 24. During full depression of the center button 30, the lower end 80a of the plunger 80 nearly bottoms out within the groove or recess 108 forcing full retraction of the stopper 34 into reduced diameter portion 20a of lower casing half 20, FIG. 3A. This permits relative free rotation of the threaded sleeve or shank 24 on cap assembly 16.

In that respect, the cap assembly or actuator 16 is surrounded by an annular metal shell 115, FIG. 2, which has a cylindrical outer wall 117 bearing radially inwardly directed flange 117a on which rides radially enlarged flange 122 of the threaded shank 24. When the stopper 34 is fully retracted as per FIG. 4, the actuator or cap assembly 12 is free to rotate relative to the shank 24. To place it in true perspective, the cap assembly 16 when rotated will not rotate the shank 24, under these conditions, since the shank 24 is threaded into the threaded fuel tank filling neck 12 and there is a lack of mechanical engagement between the stopper 34 and the threaded shank 24 at radial recess 36 (FIG. 2).

If there is a circumferential misalignment between the stopper 34 and the recess 36 within the threaded shank 24, the projecting edge 34b of the stopper will ride on the inner periphery of the cup shaped threaded shank 24 until the stopper is aligned with the recess 36, then it will project therein to mechanically lock the threaded shank 24 to the cap assembly 16 such that by further rotation of the cap assembly 16, the cap assembly 16 and the threaded shank 24 will rotate in unison.

Figure 4:
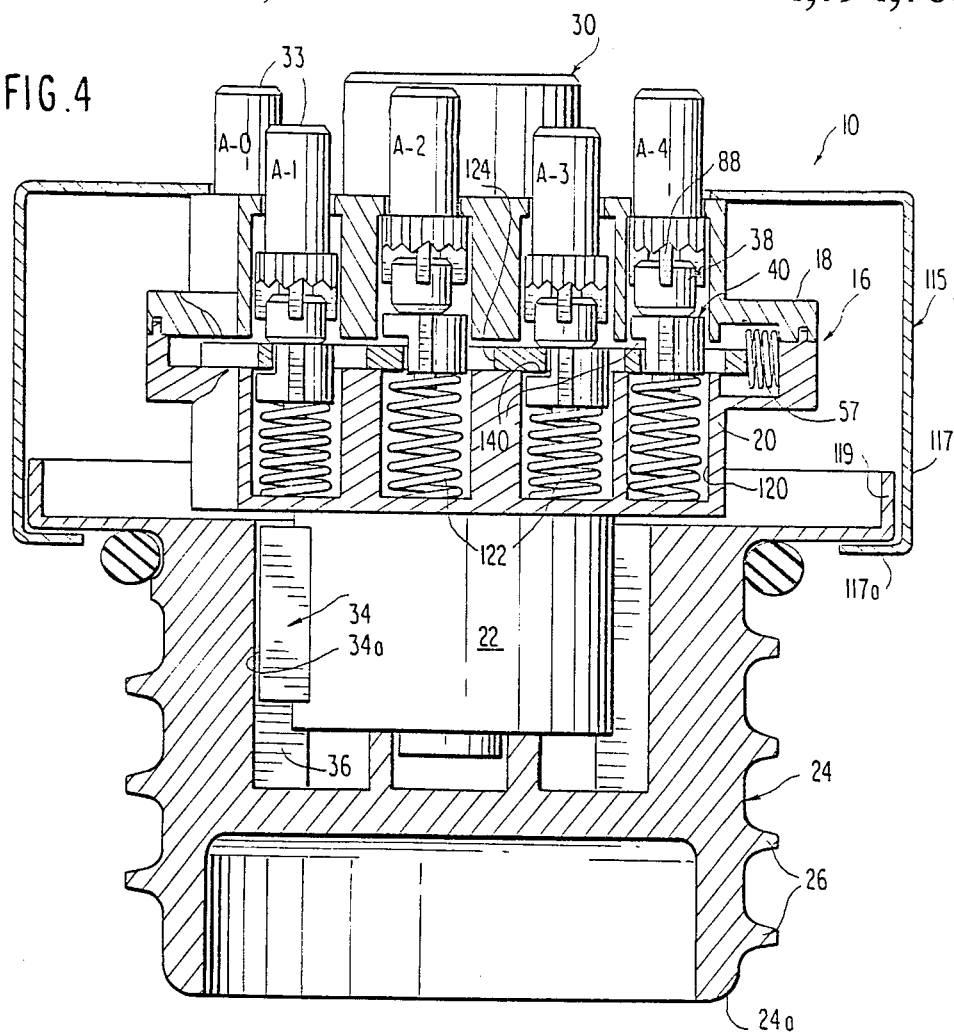
FIG. 4 is a vertical sectional view similar to that of FIG. 2 under gas cap unlocked conditions.
Figure 11:
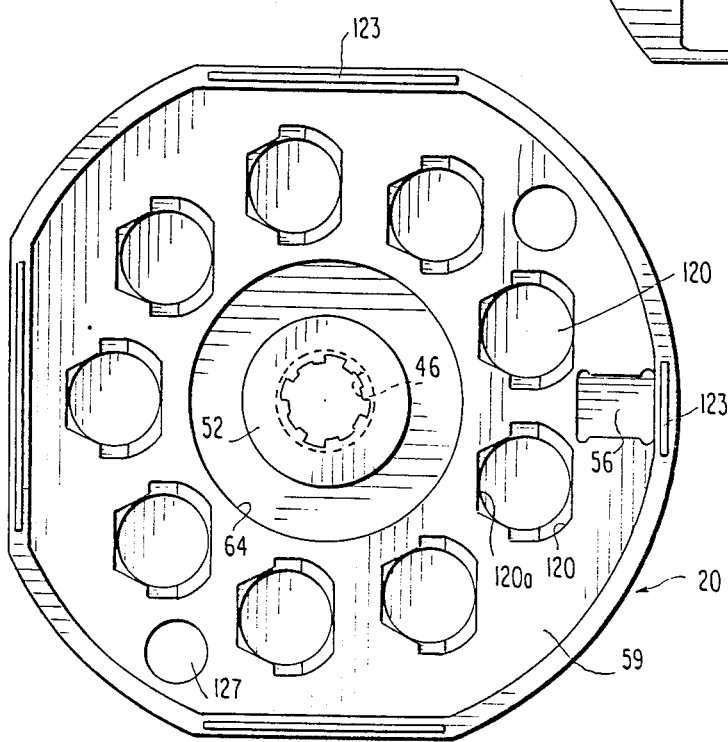
FIG. 11 is a top plan view of the bottom casing half of the gas cap of FIG. 4.

Turning next to FIGS. 2 and 4, taken in conjunction with the other figures of the drawings, it is apparent that both cap assembly upper and lower casing halves 18, 20 and metal shell 120 have axially aligned holes at each of the nine combination push button locations which holes function to mount a series of axially aligned, spring biased elements, the function of which is to set up conditions under which the slide plate can be moved from cap locked position to cap unlocked position. The cross-sectional configuration of the lower casing half holes 120 which bear individual compression coil springs 122 is essentially D-shaped as seen in FIGS. 11, with the flats 120a thereof all facing in the same direction, away from coil spring 57. The configuration and sizing of holes 120 is somewhat different than companion holes 124 within slide plate 32, FIG. 10, having flats 124a oriented to the same side as lower casing half 20. The casing halves 18, 20 are oriented by vertical ribs 123 carried by half 20 projecting within grooves 125 of half 18, FIG. 2 and locked together by screws 127, FIGS. 7, 8.

Figure 14A:
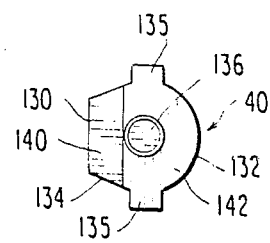
FIG. 14A is a plan view of a lock pin employed in the combination gas cap of FIG. 1.
Figure 14B:
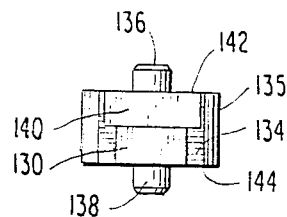
FIG. 14B is a front elevational view of the lock pin of FIG. 14A.
Figure 14C:
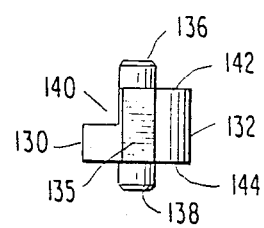
FIG. 14C is a side elevational view of the lock pin of FIGS. 14A and 14B.

FIGS. 14A, 14B, and 14C are respective, top plan, front and side views of one of the lock pins 40 which float within the upper ends of holes 120 within the cap assembly lower casing half 20, and within aligned holes 124 of the slide plate and holes 126 of the upper cap assembly casing half 18. Each lock pin 40 is of D-shape plan configuration having a flat front face 130, a semi-cylindrical rear face 132 and tapered or oblique surfaces 134 to opposite sides thereof, joining the semi-cylindrical rear face 132 to the flat front face 130 and extended by wings 135. Further, at the top 142 and bottom 144 surfaces there are same diameter cylindrical projections of each lock pin 40, at 136 and 138 respectively. Further, a right angle notch or transverse groove 140 is formed within the lock pin flat top surface 142 over one half of its vertical height toward flat bottom surface 144 thereof. The right angle recess 140 is formed within the flat front face 130 to the outer periphery of the reduced diameter projection 136 at the top of the lock pin 40. As will be seen, in order to set up the desired combination, the lock pins 40 are inserted either in a recess position, as for instance for push buttons numbers A-1 and A-3, FIGS. 2 and 4 while, the lock pins for the remaining combination push buttons numbered A-0, A-2, A-4, A-5, A-6, A-7 and A-8 are in the inverted position such that the recesses 140 face downwardly rather than upwardly. The flat front face 130 and the wings 135 provides a particular configuration for the lock pin. Matching configurations are given to the holes 120, 124 and 126 which partially receive the same, to ensure maintenance of these elements in a predefined orientation and within an axially adjustable assembly relative to the aligned holes formed within the various stacked components.

For purposes of explanation and ease in manufacture and assembly, the combination push buttons 33 are identical to long pin 90 discussed in detail with respect to FIGS. 3, 5, 12 and 12a and forming a component associated with the center button 30. Underlying combination push buttons 33, pads 38 are provided identical to the pod 38 employed between long pin 90 and plunger 80, FIG. 3. In that respect as seen in FIGS. 2, 4, 4a and 15, the upper casing half 18 of the cap assembly 16 has, within the series of holes or bores 126 thereof, a plurality of spline radial projections 150, defined by circumferentially spaced grooves 152, with the lower edges of those radial projections as at 150a being oblique (45°). Spline radial projections 33a of the combination push buttons 33 are fitted to the grooves 152 so that the push buttons 33 are prevented from rotating within the cooperating splined holes 126 as they are depressed axially against the bias of the individual coil springs 122 carried within the aligned holes or bores 120 within the bottom casing half 20 of the cap assembly 16.

Figure 4A:
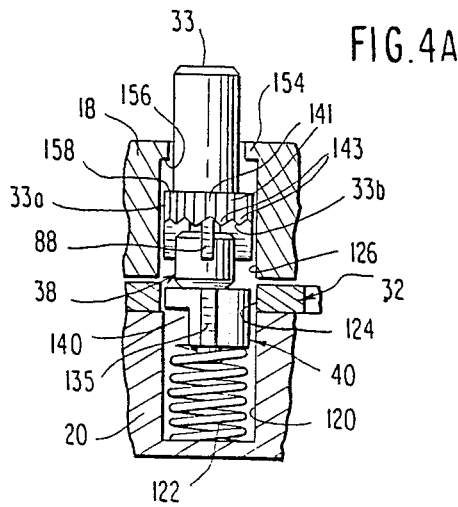
FIG. 4A is a vertical sectional view of the gas cap of FIG. 1 showing one of the push button assemblies in depressed hold condition.

It should be appreciated, that the type of detent action for spring biased, latching of the center button 30 and the combination push buttons 33 in their depressed position and the subsequent release from the depressed latched position upon further depression of the push button is an action which is commercially employed in mechanical pens where the ball point is exposed when an axial plunger is depressed and held in the exposed position and wherein, the ball point is retracted into the tip of the pen when the plunger at the opposite pen of the end is depressed a second time. The elements making up the assembly as illustrated in FIG. 4A have some correspondence therefor to that of such ball point pen. However, the elements in Applicants' gas cap and actuator 16 for the same facilitate a permitted lateral shift in position of a slide plate 32. As a result thereof, a change in state of the plunger 80 operatively coupled to the center push button 30 may occur. In the gas cap 10 embodiment of the invention, a change of state from locked to unlocked condition and vice versa results. By performing a similar function, i.e., change of state, the actuator 16 per se which may be employed in other environments.

Figure 15:
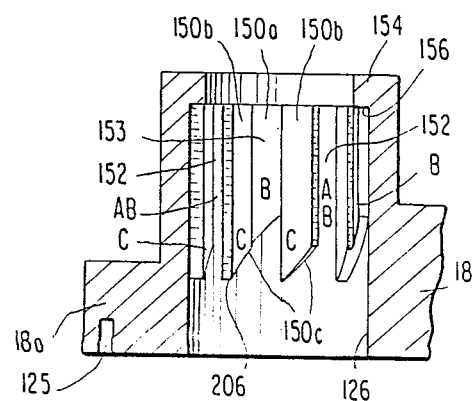
FIG. 15 is a vertical sectional view of the upper portion of the cap member illustrating the splined bore slidably receiving one of the combination push buttons.

In that respect, and in order to show the sequence of operation, reference may be had to FIGS. 12, 12A, 13, 15, 16, 17A through 17D, respectively. In identical fashion to the operation of the long stem 90 of FIG. 12, and pod 38 of FIG. 13 associated therewith, the combination push buttons 33, are individually depressed, locked and released. For each combination push button 33, a pod 38, a lock pin 40 and a coil spring 122 are employed in descending order to form a spring biased assembly, the coil spring 122 biasing such assembly ypwardly. The sequence of actuation involves a first depression, and lock and a further depression prior to full release as per FIGS. 17A–17D. Each of the combination push buttons 33 has, spline grooves 141, FIG. 4A, labeled "C", defining, alternately, radial projections 143, labeled "B". In the illustrated embodiment, there are eight circumferentially spaced grooves 141 on the radially enlarged bottom portion 33a of push button 33 and a similar number of radial projections 143. The adjacent grooves and projections are respectively at 45° to each other. As noted previously, the bottom of the push button 33 is serrated forming alternately opposite oblique beveled edges at 33b at 45° to the axis thereof. Additionally, with respect to the pod 38, FIG. 13, each of the radial projections or bars 88 of that member terminate in an upper oblique edge labeled 88a. The third element forming a portion of the spline connection for each push button 33 is the upper casing half 18, the bores 126. They slidably receive the combination push buttons 33 via the circumferentially spaced radially outward projections 150, circumferentially spaced at four locations (90° apart) by grooves 152. The projections 150, each include a radial groove 153 therein, defining a shorter length radial projection portion 150a having a radial thickness about one half that of the radial projection portions 150b formed to each side thereof. As seen in FIG. 15, while all of the radial projection portions 150a, 150b have tapered or oblique lower edges at 45° to the vertical, FIG. 15 the outer two radial projections 150b portions of each radial projection 150 extend to a greater axial depth than that of the intermediate portion 150a. For illustrating purposes, the longer portions 150b are lettered C since, they receive grooves C of the depressible combination push buttons 33 while, the radial projections of push button 33 labeled B, are alternately positioned within the full radial depth grooves 152 and the shallower grooves 153 therebetween.

Figure 16:
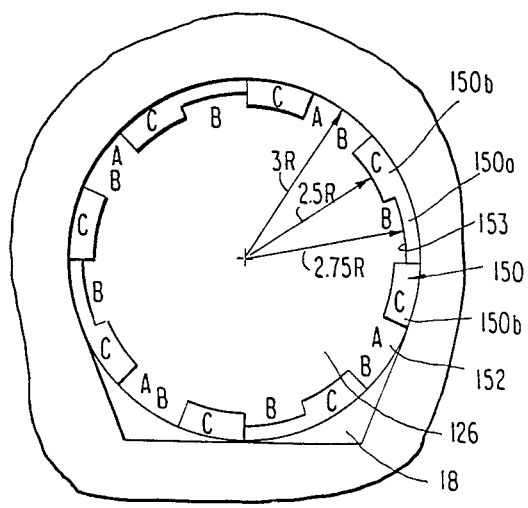
FIG. 16 is a bottom plan view of the portion of the upper half of FIG. 15 at said splined bore.
Figure 7:
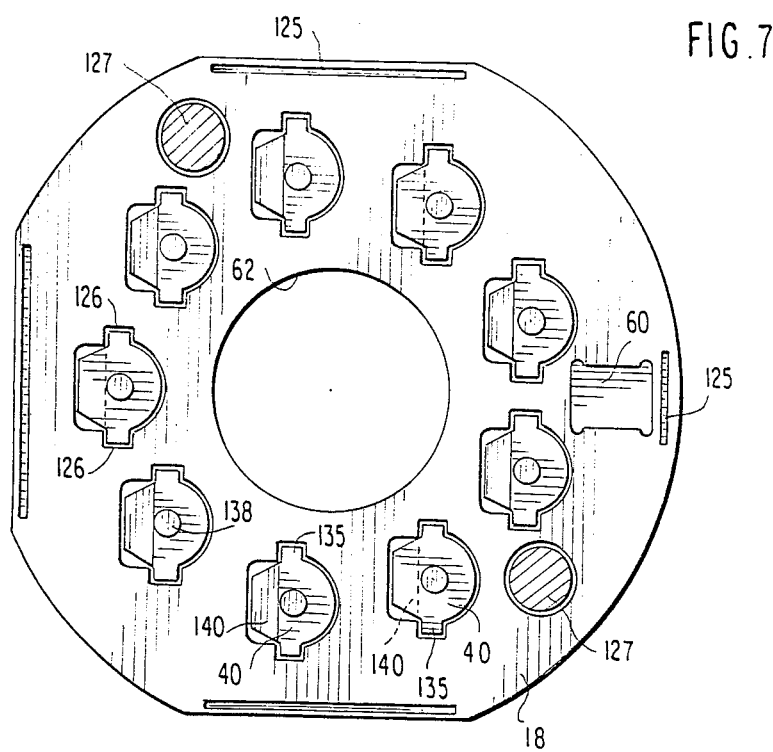
FIG. 7 is a transverse sectional view of the gas cap of FIG. 2 about line 7—7 of the upper half of the cap casing with the reversible pods positioned therein.
Figure 8:
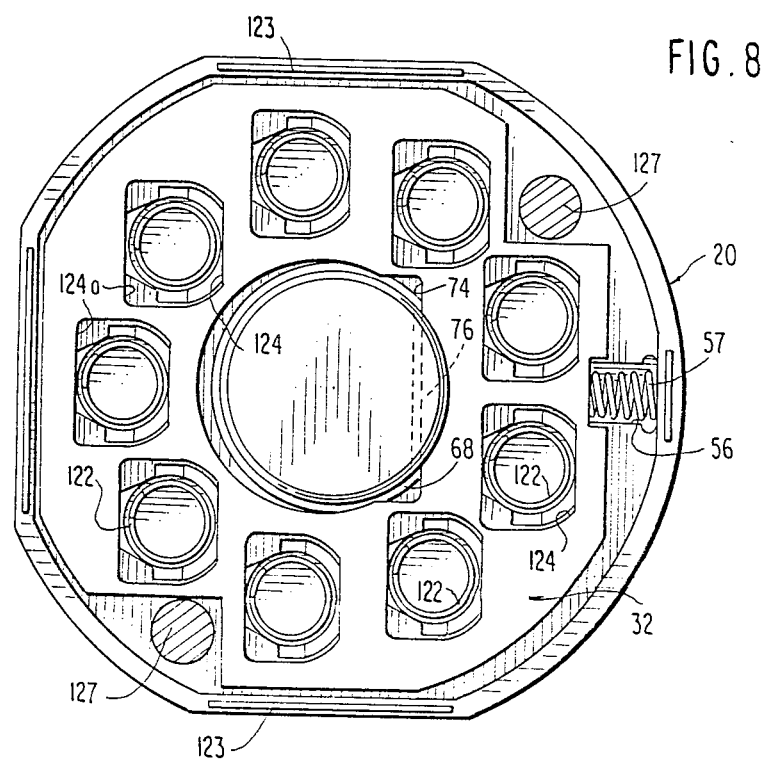
FIG. 8 is a transverse sectional view of FIG. 2, about line 8—8 showing the lower half of the casing with the slide plate mounted thereon.
Figure 9:
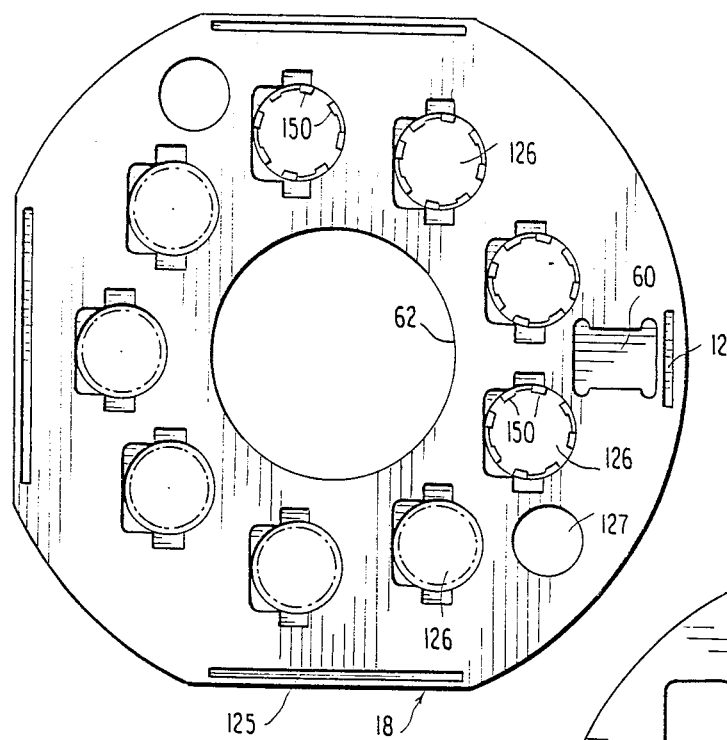
FIG. 9 is a bottom plan view of the upper half of the casing of the gas cap of FIG. 1.
Figure 10:
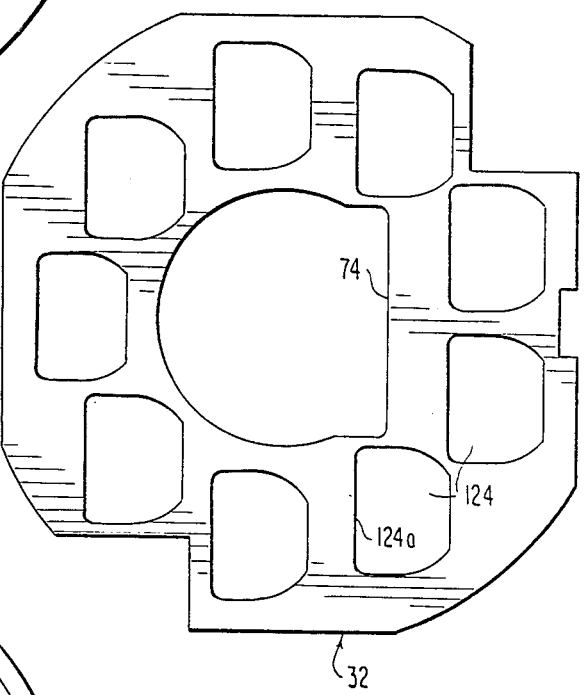
FIG. 10 is a top plan view of the slide plate of the gas cap of FIG. 1.

As such, the depressible combination push buttons 33 are prevented from rotating but they may be axially depressed against the bias of the coil springs 122 from the full projected position FIG. 17D to the fully depressed position FIG. 17B. In the graphic showing of FIG. 16, it is noted that three different radii are employed to form the female spline; a radius 3R defining a full depth groove 152 between the radial projections 150 as seen in FIG. 15, a radius 2.5R to the inner surface of the full radial projections 150b and a radius 2.75R for the shallower grooves B defined by thinner radial projection portions 150a, FIG. 16. In the superpositioning of the components and for a comparison in positions for the components as evidenced in FIG. 17A through 17D inclusive. FIG. 16 shows a coincidence of letters A and B for the full radial slots 152, under conditions illustrated in FIG. 17D where, the pod radial bars 88, as indicated by letters A FIG. 13, move into the full depth grooves 152 within upper case half 18 bore 126, FIG. 15. Each time that the push button 33 is depressed a full stroke and released, its pod 38 rotates 45°, each bar 88 thus moving essentially from a half groove 153 position in which the oblique edge 88A of the radial projection or bar 88 abuts the oblique edge or face 150c bore 125 female of the spline projection portion 150a, to alignment with a full depth groove 152. At a half groove 153 position, the pod 38 is prevented from further rotating as a result of the sliding action between the depressed push button 33 and the radial projections or bars 88 of the underlying pod 38 by the presence of full length spline projection portions 150b to the left thereof, FIG. 15. The pod radial bars 88 never rest in a push button or long stem toothed crevice. The pod 38 have their bars 88 either landing in a free AB groove 152 or impinged against the top (150c) of a radial projection portion 150a forming shallower B groove 153.

In the sequence of FIGS. 17A through 17B, at FIG. 17A position due to the presence of the 45° angle radial projections or bars on the pods 38, and the upward force of the coil spring 172, each pod 38 wants to rotate counter clockwise along the path of the 45° angle beveled surface 150c, however, since the spline radial projection C immediately to the right, FIG. 17A is blocking its path, the pod 38 is stopped in its "down position".

By depression of the push button 33 (or long stem of center push button 30) which has an angled "tooth" that travels in a fixed path, the oblique or angled radial projection or bar 88 of pod 38 is caught and begins to move downwardly along with the push button 33.

As indicated in FIG. 17C, once the angled radial projection or bar 88 reaches the pinnacle of spline radial projection C, it rides over onto the oblique face 150c and being freely rotatable at this point, it rotates counter clockwise along the path of the spline radial projection face 150c and the angle "tooth" portion of the push button 33. Coil spring 122 applies an axially upward force to maintain all parts in contact and to force the pod 38 to rotate while moving upwardly as indicated by the oblique arrow 202 FIG. 17C, in contrast to the initial depression movement, as per arrow 200, of the push button 33, FIG. 17B.

The pod 38 continues to rotate counter clockwise along the path of contact between face 88a of the pod radial projection or bar 88, and the corresponding oblique face 150c of the spline radial projection until the radial projection or bar 88 simply runs off the oblique edge of that radial projection and falls into the full groove 152 between the spline radial projections 150 of bore 126. With nothing blocking its path, the radial projection or bars 88 move into the full spline groove 152, i.e. at position AB, FIG. 16. It is pushed immediately upwardly under the force of the expanding coil spring 122. This action is depicted by the stop, up arrow 204, FIG. 17D. The spline radial projection 150b next to spline groove 152 (AB) restrains the pod 39 from rotating. The pod 38 wants to rotate because the push button 33 has its lower edge serrated at an angle similar to the oblique angle of the pods radial projection or bar 88. Since the pod 38 has not yet "bottomed out" in the push button 33 angled tooth, it still wants to rotate counter clockwise. However, since the rim (shoulder) 158 of the push button 33 is next to the overhang 154 of the hole or bore 126, the coil spring 122 can not push up the axially aligned end abutting components including the push button 33 to any greater extent. The pod 38 is thus stuck in the "stop-up" arrow 204, position at which point, the recess 140 of the rotating lock pin 40 aligns with the hole and slide plate so that under these conditions the slide plate 32 is free to move to the left under the bias of the coil spring acting thereon.

If the combination push button 33 is pushed down again, the pod 38 will move downwardly with the push button 33. Once the pods radial projection or bar 88 reaches the pinnacle 206 of bore spline radial projection portion 150, at each C location FIG. 15, it will want to rotate counter clockwise along the path of the oblique sloped edge 150c until it "bottoms out". However, the spring 122 will push all of the components upwardly and since the pod 38 has already rotated a slight distance, each angled radial projection or bar 88 will catch on a spline slope edge 150c and move onto a spline projection 150a. At this point the action ceases since due to the presence of the next full length, full depth spline radial projection 150b, the pod is blocked from further movement until the sequence of action takes place depicted in FIGS. 17A through 17D inclusive.

It should be appreciated that the sequence of operation and action is illustrated in FIGS. 17A and 17D for each of the combination push button 33 has an exact corollary for center push button 30 via long stem 90, its pod 38 and plunger 80, and in which case, the coil spring 86 provides the biasing force acting on that assembly. Further, the radially inwardly projecting rims 154 formed within the upper casing half 18 define radial shulders 156 which abut radial shoulders 158 formed by the radially enlarged lower ends 33a of the combination push buttons 33. Additionally, the radial projections or bars 88 which project outwardly from the cylindrical lower ends of the rotating pods 38 are maintained within the spline groove 152 at four locations within the holes 126 orienting the rotating pods and causing a slight rotation of the same during return of the push buttons 33 from the fully depressed to the fully projected position as shown in FIG. 4.

With respect to the combination push buttons A-1 and A-3, depressed action and locking of these push buttons 33 cause the notches 140 of the lock pins 40 to hold vertically aligned with the holes 124 of slide plate 32, FIG. 4, associated with those combination push buttons. This clears the path for the slide plate 32 to shift in a direction against the bias of coil spring 57, via release of depressed center push button 30 and to permit a change of state of the gas cap 10, from locked to unlocked position, when cammed to the right FIG. 2 by released center push button 30. Release is effected by further momentary depression of center button 30, 45° rotation of its pod 38 to aligne the pod 38 bars 88 with full length female bore spline grooves of its bore 46.

Further, the operation of the push button actuated combination lock type gas cap 10 may be appreciated by reference to FIGS. 1 through 5 inclusive. The gas cap 10 as shown in FIGS. 2 and 3 is under locked conditions, that is, where the cap assembly 16 and specifically the upper and lower casing halves 18, 20 are rotatable as a unit relative to the threaded shank or sleeve 24 which remains threaded and unmoving within the fuel tank filling neck. Under these conditions, the slide plate 32 cannot move towards the compression coil spring 57 since the lock pins 40 beneath the combination push buttons 1 and 3 of the series A0–A9 are such that recess 140 is right side up and oriented so that the full transverse thickness of those lock pins 40 fill the D-shaped holes 124 within the slide plate 32 and prevent that movement. The position of the slide plate 32 under these conditions, as seen in FIG. 3, is a position blocking the center button 30, which is depressed and locked at its "stop down" position. The coil spring 57 biases the edge of the slide plate at the center hole 74 into the recess or indention 76, the edge of the slide plate acting as a pawl preventing the upward movement of the center button 30, and its long pin even if depressed again and even though coil spring 86, around plunger 80, is fully compressed and there is a bias force stronger than that of spring 57 tending to drive that plunger axially upwardly. Under these conditions, the lower end 80a of the plunger maintains cams the stopper 34 to the right. FIG. 2 stopper edge 34b retracted from recess 56 against the bias of coil spring 112. Cap assembly 16 is therefore rotatable about its axis relative to the threaded shank 24 threaded to the neck of the fuel tank and which shank is rotatably mounted on the outer periphery of the reduced diameter portion 20a of the lower casing half 20 of assembly 16.

Since the plunger 80 cannot move upwardly, the stopper is not permitted to move from retracted to projected position to lock the shank to the cap.

However, by depressing the, preset, push buttons of the set of combination push buttons 33 (at number positions 1 and 3, FIG. 6,) the lock pins 40 associated therewith are forcibly held in depressed slightly against the bias of coil springs 152 at positions corresponding to FIG. 17A where the rectangular notches 140 within the lock pins 40 are parallel to the slide plate 32 and are held in that position by the splines. As such, the slide plate path 32 is clear to move from left to right in the figures to compress the coil spring 57 by release of the center button 30. Release of the center button 30 is then accomplished since the slide 32 is free to shift to the right FIG. 5, and does so by being cammed by center button recess 76 under the bias of coil spring 86, against the bias of spring 57.

As seen in FIG. 5, all the rotating pods 38 are held in spline grooves that let them stay at "stop-up" or "stop-down" positions. In order for the center button 30 to move to "stop-up", center button 30 must first be moved slightly downwardly to allow the rotating pod 38 radial bores 88 to be released from the spline grooves corresponding to short grooves 153, FIG. 16, holding it in the "stop-down" position. Since the slide plate 32 path is now clear, the center button 30 moves upwardly to the extent where its rim 68 abuts the lower face 70 of the slide plate. At this point, the lower end 80a of the plunger is almost fully retracted from recess 56 and the stopper 34 is thereby released and shifts under the bias of compressed coil spring 112 to its full radially projected position, FIG. 5. In this position, edge 34b of stopper 34 is received within the recess or groove 36 within the threaded shank 24 of the cap 10, mechanically locking the shank 24 to the actuator 16 and rotation of actuator cap assembly 16 will cause like rotation of sleeve or shank 24 in either direction of rotation.

Since the center button 30 is also held in the "stop-down" position by splines exactly the same way as the combination push buttons 33 are, the angled indent or recess 76 within the periphery of the center button is engaged by the slide plate under the bias spring 57 which keeps the center button 30 from being further depressed to release the rotating pod from the splines to hold the plunger down. Thus, when the gas cap is placed back onto the gas tank after filling the tank will gas, it is necessary to first push the center button down, and it will be held in the "stop-down" position by the spline. Secondly, the correct numbered push buttons of the pre-set combinations are further depressed so that they are returned to their "stop-up" positions so that the cap 10 is again locked as shown in FIG. 3. As described previously, it is not the indent or recess 76 within the side of the center button 30 and the slide plate 32 that maintains the plunger 80 down, and the stopper 34 retracted, but rather it is the respective splines and the rotating pods which hold the plunger in depressed position against the bias of coil spring 86 and the stopper retracted against the bias of coil spring 112.

Additionally, it should be appreciated that the major components of the combination type gas cap form an independent actuator 16 of the push button combination type, useful in other applications for locks such as in a push button operated door knob. By the simple expedient of changing only the plunger 80, and/or the stopper 34, the actuator 16 utilizes all of the other components of the actuator 16 as shown in FIGS. 3 and 5, including, the upper and lower case halves, the slide plate, the center button, with its "long stem" pods and lock pins.

For instance, by changing the shape of the plunger and adding a further, rotatably driven element as a follower and responsive to plunger depression and retraction, the actuator 16 may be cause to produce a rotational motion in an end element which acts the same way as a "key" in opening a standard door knob as a result of rotation rather than axial shifting of a detent element. Thus by substituting for the stopper that slides radially into the shank that is threaded into the neck of the gas tank, which functions as an accessory, the push button assembly remains the same but the push button lock can meet different functions and different environments.

Although but one embodiment of the invention has been shown and described, it will be apparent to those skilled in the art that various changes and modifications may be made therein without departing from the spirit of the invention, or from the scope of the dependent claims.

What is claimed is:

1. A push button combination lock type gas cap comprising: a casing mountable to an open end of the fuel tank filling neck, a stopper mounted within said casing for movement between a first position in which the cap is removable from the filler neck, and a second position where the cap is locked thereto, a first push button mounted on said casing for movement in the direction of its axis between projected and depressed positions, means responsive to depression of said first push button for shifting said stopper to said first position for locking said cap to said filler tube, means for holding said first push button in depressed position in response to depression thereof, shiftable pawl means carried by said casing for normally preventing retraction of said first push button, upon depression thereof, a plurality of second push buttons mounted to said casing for shifting in the direction of their axes between retracted and depressed positions, means for holding said second push buttons in depressed position after depression thereof, and means responsive to depression of selected ones of said second push buttons for effecting release of said pawl means thereby permitting movement of said first push button from depressed to retracted position and for effecting stopper movement from cap lock to cap unlock position.

2. The push button combination lock type gas cap of claim 1 wherein, said pawl means comprises a slide plate mounted within said casing for movement at right angles to direction of the movement of said first and second push buttons, said slide plate constituting a pawl, a recess within the periphery of said first push button alignable with said pawl, means biasing said slide plate in a direction such that a portion of said slide plate projects within said recess, said slide plate recess being at a position such that, with the first push button depressed, said pawl engages said recess to prevent extraction of said first push button and means, operatively engaging said second push buttons and responsive to depression of selected ones of said second push buttons for releasing said slide plate to permit said slide plate to shift from pawl engagement position to pawl disengagement position with said first push button.

3. The push button combination lock type gas cap as claimed in claim 1 wherein, said casing includes a plurality of parallel cylindrical bores, said push buttons are coaxially positioned within respective bores, and said gas cap further comprises spline means for said push buttons and said bores to permit said push buttons to be axially movable within said bores but preventing rotation thereof, and a rotating pod mounted within each bore, beneath a respective push button, each rotating pod including radial bars mounted thereon, and engaging said spline means of said bore, and wherein, said push buttons facing said rotating pods have serrated edges, and said rotating pod bars have matching beveled ends engaging said serrations and wherein, said spline means of said bore constitute alternating radial grooves and radial projections, said bore radial grooves receiving said radial projections of said push buttons and said radial bars of said rotating pods, said groove radial projections having matching oblique ends facing said oblique edges of said rotating pod radial bars and being engagable therewith and wherein, the alternating spline grooves within said casing bore are of different lengths such that, during depression and retraction of the push buttons, the oblique ends of said rotating pod bars, engage the serrated ends of said push buttons such that the edges of said rotating pod radial bars tend to function as cam followers to effect rotation of the pods during depression and retraction of the push buttons while, the serrated ends of the push button and the oblique ends of the casing bore spline radial projections function as axial stops for said radial bars of said pod to limit axial movement of said rotating pods within the casing bore spline slots.

4. The push button combination lock type gas cap as claimed in claim 3 wherein, said means responsive to depression of said first push button for locking said cap to said filler tube neck comprises, a spring biased plunger mounted within said bore, underlying said rotating pod, a coil spring concentric to said plunger and interposed between said casing and said plunger for spring biasing said plunger, said pod and said first push button towards first push button retracted position, and wherein, for each of said second push buttons, said slide plate comprises a plurality of holes therein at position corresponding to the respective positions of said second push buttons, lock pins are positioned at the level of the slide plate within said slide plate holes, respectively, coil springs are mounted within said casing bores bearing said push buttons, and interposed between the casing and the side of the lock pin opposite said rotating pod and wherein, each of said lock pins include a recess within a side thereof, said lock pins being reversibly positionable so that, said recesses are alignable with the slide plate openings when given ones of said second push buttons are in the retracted position and when selected ones of said second push buttons are in the depressed position whereby, the slide plate may be moveable laterally to release said pawl from said first button recess thereby when the recesses of all the lock pins are at the level of said slide plate, permitting retraction of the first push button, and unlocking of the gas cap.

5. The push button combination lock type gas cap as claimed in claim 4 wherein, said first push button comprises a center push button, and said said second push buttons are circumferentially spaced in a circular array about said center push button.

6. The push button combination lock type gas cap as claimed in claim 5 wherein, said slide plate holes are nonsymmetrical, and wherein, said lock pins are of similar nonsymmetrical configuration matching that of said holes such that, said lock pins are maintained in oriented position when positioned therein irrespective of whether the lock pin recess is within the bottom of the lock pin or the top of the lock pin and preventing said lock pins from rotating to follow the rotation of the rotating pods engaging the same.

7. The push button combination lock type gas cap as claimed in claim 6 wherein, the lower end of said push buttons include an axial recess, said rotating pods are of cylindrical form, and include a axial projection at their upper ends facing the push buttons sized to and inserted within said push button axial recess, a further axial recess is provided within the lower ends of said rotating pods and wherein, said lock pins are of modified cylindrical form, and include axial projections at opposite ends thereof, one of said projections received within the axial recess of the lock pin engaged therewith and the other projection, being positioned within the coil spring coaxial therewith and carried within a respective bore of said casing.

8. The push button combination lock type gas cap as claimed in claim 7 wherein, said casing includes a stopper recess at the end opposite said push buttons, said recess being at right angles to the axis of the casing, said stopper comprises a rectangular cross-section stopper plate slidably mounted within said casing stopper recess and having radially inboard and outboard ends, said plate including an oblique cam follower surface facing said plunger and engagable therewith, and a stopper coil spring mounted within said casing stopper recess and interposed between the inboard end of said stopper plate, and said casing and spring biasing said stopper plate outboard end in a radially projected position and wherein, said stopper plate is sized such that the outboard end of the stopper opposite that engaged by said stopper spring, normally projects radially outward of said casing and said stopper plate is of a length such that, upon depression of said first push button and depression of the plunger coaxially mounted therewith, the end of the plunger cams said stopper plate against the bias of the stopper spring to retract the stopper so that it is fully retracted within said casing.

9. The push button combination lock type gas cap as claimed in claim 1 wherein said fuel tank filling neck is internally threaded, and said casing comprises a radially inwardly directed annular flange, a hollow threaded shank having a radially enlarged flange mounted to said casing radially inwardly directed flange and rotatable thereon, a radial recess within the interior of said hollow threaded shank, at the level of said stopper, means for mounting said stopper for movement radially into radially projected and retracted position with respect to said radial recess within said threaded shank, said fuel tank filling neck threadedly receives the threaded shank and wherein said first push button overlies a spring biased axially moveable plunger operatively engaging said stopper and radially retracting said stopper in response to axial depression of said first push button, and permitting said stopper to project radially outwardly into the recess of said threaded shank upon retraction of the first push button and release of said spring biased plunger.

10. A combination lock actuator comprising: a hollow casing, a stopper mounted within said hollow casing for movement between first and second position to effect locking and unlocking actions respectively, a first push button mounted on said casing for movement in the direction of its axis between projected and depressed positions, means responsive to depression of the first push button for shifting said stopper to said first position, means for holding said first push button in depressed position in response to depression thereof, shiftable pawl means carried by said casing and operating engaging said first push button for normally preventing retraction of said first push button upon depression thereof, a plurality of second push buttons mounted to said casing for movement in the direction of their axes between retracted and depressed positions, means for holding said second push buttons in depressed position after depression thereof, and means responsive to depression of selected ones of said second push buttons for effecting release of said pawl means thereby permitting movement of the first push button from depressed to retracted position, and for effecting stopper movement from said locked position to said second unlocked position.

11. The push button combination lock type actuator as claimed in claim 10, wherein said pawl means comprises a slide plate mounted within said casing for movement at right angles to the direction of movement of said first and second push buttons, said slide plate constituting a pawl, a recess within the periphery of said first push button and alignable with said pawl, means biasing said slide plate in a direction such that a portion of said slide plate projects within said recess, said recess being at a position such that, with the first push button depressed, said pawl engages said recess to prevent extraction of said first push button and means, operatively engaging said second push buttons in responsive to depression of selected ones of said second push buttons for releasing said slide plate to permit said slide plate to shift from pawl engagement position to pawl disengagement position with respect to said first push button.

12. The push button combination lock type actuator as claimed in claim 11, wherein said casing includes a plurality of parallel cylindrical bores, said push buttons are coaxially positioned within respective bores, said casing further includes spline means for said push buttons and said bores to permit said push buttons to be axially moveable within said bores but preventing rotation thereof, a rotating pod mounted within each bore beneath a respective push button, each rotating pod including radial bars mounted thereon and engaging said spline means of said bore, said push buttons have serrated ends facing said pods and said rotating pod bars have matching beveled edges engaging said serrations, said spline means of said bore constitute alternating radial grooves and projections with said projections having matching oblique ends facing said rotating pod radial bar beveled edges and engageable therewith, said radial grooves of said bore spline means receive said radial projections of said push buttons and said radial bars of said rotating pods, and wherein the alternating spline grooves within said casing bore are of different lengths such that during depression and retraction of the push buttons, the oblique ends of each rotating pod bars engages a serrated end of a push buttons such that the rotating pod radial bars function as cam followers to effect rotation of the pod during depression and retraction of the push button while, the serrated ends of the push buttons and the oblique ends of the causing bore radial projections function as axial stops for the radial bars of said pod to limit axial movement of said rotating pods within the casing bores spline grooves.

13. The push button combination lock type actuator as claimed in claim 12 wherein, said means responsive to depression of the first push button for locking said gas cap to said filler tube neck comprise a spring biased plunger mounted within a casing bore, underlying said rotating pod, a coil spring concentric to said plunger and interposed between said casing and said plunger for spring biasing said plunger, said pod and said first push button towards first push button retracted position, and wherein for each of said second push buttons, said slide plate comprises a plurality of holes at positions corresponding to respective positions of said second push buttons, lock pins are positioned at the level of the slide plate within said slide plate holes, respectively, coil springs are mounted within said casing bores bearing said push buttons and interposed between the casing and the side of the lock pins opposite said rotating pods and wherein each of the lock pins includes a recess within a side thereof, said lock pins being reversibly positionable so that the recesses thereof are alignable with the slide plate openings when given ones of the second push buttons are in the retracted position, and when selected others of the second push buttons are in the depressed position whereby, the slide plate is moveable laterally to release the pawl from the first push button recess when, the recesses of all of said lock pins are at the level of said slide plate openings.

14. The push button combination lock type actuator as claimed in claim 10 wherein, said first push button comprises a center push button, and said second push buttons are circumferentially spaced in a circular array about said center push button.

15. The push button combination lock type actuator or claimed in claim 13, wherein said slide plate holes are nonsymmetrical and wherein said lock pins are of similar nonsymmetrical configuration matching that of said slide plate holes such that, said lock pins are maintained in oriented position when positioned therein, irrespective of whether the lock pin recess is within the bottom of a lock pin or the top of the lock pin whereby said lock pins are prevented from rotating to follow the rotation of the rotating pod engaging the same.

16. The push button combination lock type actuator as claimed in claim 15, wherein the lower ends of said push buttons include an axial recess, said rotating pods are of cylindrical form and each include an axial projection at their upper ends facing the push buttons and inserted within said push button axial recess, a further axial recess is provided within the lower end of said rotating pods, and wherein said lock pins are of modified cylindrical form and include axial projections at opposite ends thereof, one of said projections being received within the axial recess of the lock pin engageable therewith, and the other projection being positioned within the coil spring coaxial therewith and carried within a respective bore of said casing.

* * * * *